United States Patent
Ben-Itzhak et al.

(10) Patent No.: US 9,813,873 B2
(45) Date of Patent: Nov. 7, 2017

(54) MOBILE DEVICE TRACKING PREVENTION METHOD AND SYSTEM

(71) Applicant: AVG Netherlands B.V., Amsterdam (NL)

(72) Inventors: Yuval Ben-Itzhak, Brno (CZ); Shaul Levi, Amsterdam (NL); Pavel Mironchyk, Amsterdam (NL)

(73) Assignee: Avast Software B.V. (NL)

( * ) Notice: Subject to any disclaimer, the term of this patent is extended or adjusted under 35 U.S.C. 154(b) by 50 days.

(21) Appl. No.: 14/322,634

(22) Filed: Jul. 2, 2014

(65) Prior Publication Data

US 2015/0024787 A1   Jan. 22, 2015

Related U.S. Application Data

(60) Provisional application No. 61/846,886, filed on Jul. 16, 2013, provisional application No. 61/904,865, filed on Nov. 15, 2013.

(51) Int. Cl.
  *H04W 4/02* (2009.01)
  *H04W 8/22* (2009.01)
  (Continued)

(52) U.S. Cl.
  CPC ............ *H04W 4/027* (2013.01); *H04L 12/18* (2013.01); *H04L 12/189* (2013.01);
  (Continued)

(58) Field of Classification Search
  CPC ....... H04W 4/07; H04W 12/02; H04W 4/028; H04W 4/027; H04W 8/22; H04W 64/006;
  (Continued)

(56) References Cited

U.S. PATENT DOCUMENTS 6,343,212 B1 * 1/2002 Weber ................. H04W 48/04
                                                                            455/404.1
7,551,930 B2 * 6/2009 Lempio ............ H04M 1/72572
                                                                            455/41.2

(Continued)

FOREIGN PATENT DOCUMENTS

EP           2421331 A1      2/2012

OTHER PUBLICATIONS

International Search Report, Application No. PCT/US2014/45277, dated Nov. 7, 2014.
European Search Report Patent Application No. 14826121.7 dated Jan. 23, 2017.

*Primary Examiner* — Joseph Dean, Jr.
(74) *Attorney, Agent, or Firm* — Kramer Levin Naftalis & Frankel LLP

(57) ABSTRACT

A mobile device tracking prevention method and system includes monitoring a mobile device for movement, determining whether an operating state of a wireless module of the mobile device should be adjusted when movement of the mobile device is detected, and controlling the operating state of the wireless module based on the determination. One or more of the actual geographic location of the mobile device, network IDs broadcasted by nearby network access points, and signal strengths of the access points as detected by the mobile device can be monitored to detect movement of the mobile device. Changes to any of these may be indicative of movement of the mobile device, which may serve as the basis for enabling or disabling the wireless module to prevent tracking of the mobile device without sacrificing user productivity.

23 Claims, 4 Drawing Sheets

| Name of Parameter | General Description | Value |
|---|---|---|
| CONTROL_LOOP_TIME | Periodicity of control loop execution | 30 seconds |
| NC_DELAY | A time without connection to switch off device. This is a dynamical variable that is adjusted depending on the mode the phone enters. | Default value and maximum value is 5 times of CONTROL_LOOP_TIME. Minimum value is 3 times of CONTROL_LOOP_TIME. |
| REACH_DISTANCE | Distance to Wi-Fi access point to enable Wi-Fi. | 300 meters |
| CHECK_DELAY | Period of inactivity after which Wi-Fi must be enabled. | 30 times of CONTROL_LOOP_TIME |

(51) Int. Cl.
*H04W 12/02* (2009.01)
*H04W 64/00* (2009.01)
*H04W 4/00* (2009.01)
*H04M 1/725* (2006.01)
*H04L 12/18* (2006.01)
*H04L 12/58* (2006.01)

(52) U.S. Cl.
CPC .... *H04L 12/1845* (2013.01); *H04M 1/72577* (2013.01); *H04W 4/028* (2013.01); *H04W 8/22* (2013.01); *H04W 12/02* (2013.01); *H04L 51/12* (2013.01); *H04M 1/72569* (2013.01); *H04M 1/72572* (2013.01); *H04M 2250/06* (2013.01); *H04W 4/008* (2013.01); *H04W 64/006* (2013.01)

(58) Field of Classification Search
CPC ............. H04W 4/008; H04M 1/72577; H04M 1/72569; H04M 1/72572; H04M 2250/06; H04L 12/1845; H04L 12/189; H04L 12/18; H04L 51/12
See application file for complete search history.

(56) References Cited

U.S. PATENT DOCUMENTS

| | | |
|---|---|---|
| 2005/0260973 A1* | 11/2005 | van de Groenendaal ............................ H04L 63/102 455/411 |
| 2006/0063560 A1 | 3/2006 | Herle |
| 2008/0225810 A1* | 9/2008 | Buchwald ............... H04W 4/02 370/338 |
| 2009/0098903 A1* | 4/2009 | Donaldson ............ G01S 19/258 455/552.1 |
| 2010/0289756 A1 | 11/2010 | Anzures et al. |
| 2011/0286437 A1 | 11/2011 | Austin et al. |
| 2012/0157113 A1* | 6/2012 | Brisebois .................. G01S 5/00 455/456.1 |
| 2012/0201143 A1 | 8/2012 | Schmidt et al. |
| 2013/0109409 A1 | 5/2013 | Ortiz |
| 2013/0176869 A1 | 7/2013 | Finlow-Bates et al. |
| 2013/0288718 A1* | 10/2013 | MacGougan ..... H04W 52/0254 455/456.4 |
| 2017/0064745 A1* | 3/2017 | Kephart, Jr. .......... H04W 76/02 |

\* cited by examiner

FIG. 5

| Name of Parameter | General Description | Value |
|---|---|---|
| CONTROL_LOOP_TIME | Periodicity of control loop execution | 30 seconds |
| NC_DELAY | A time without connection to switch off device. This is a dynamical variable that is adjusted depending on the mode the phone enters. | Default value and maximum value is 5 times of CONTROL_LOOP_TIME. Minimum value is 3 times of CONTROL_LOOP_TIME. |
| REACH_DISTANCE | Distance to Wi-Fi access point to enable Wi-Fi. | 300 meters |
| CHECK_DELAY | Period of inactivity after which Wi-Fi must be enabled. | 30 times of CONTROL_LOOP_TIME |

MOBILE DEVICE TRACKING PREVENTION METHOD AND SYSTEM

CROSS-REFERENCE TO RELATED PROVISIONAL APPLICATIONS

This application claims the benefit of U.S. Provisional Patent Application Nos. 61/846,886 filed on Jul. 16, 2013 and 61/904,865 filed on Nov. 15, 2013, the disclosures of which are hereby incorporated herein by reference in their entireties.

COPYRIGHT NOTICE

Portions of the disclosure of this patent document contain materials that are subject to copyright protection. The copyright owner has no objection to the facsimile reproduction of the patent document or patent disclosure as it appears in the U.S. Patent and Trademark Office patent files or records solely for use in connection with consideration of the prosecution of this patent application, but otherwise reserves all copyright rights whatsoever.

FIELD OF THE INVENTION

The present invention relates generally to preventing the tracking of mobile device users via radio signals (e.g., Bluetooth, WiFi, Global System for Mobile Communications ("GSM"), Near Field Communications ("NFC"), etc.) transmitted by their mobile devices (e.g., smartphones, tablet computers, laptop computers, notebook computers, personal digital assistants, etc.).

BACKGROUND OF THE INVENTION

Today's mobile devices connect to networks using various radio technologies, such as Bluetooth, WiFi, GSM, and NFC. These devices typically detect availability of radio networks in the vicinity of the device by actively probing or scanning the environment. For example, devices that include WiFi functionality typically probe the environment for WiFi networks by broadcasting probe requests in the form of short radio signals (e.g., packets). These radio signals are received by receiving devices (e.g., WiFi access points) located in the vicinity, which can then respond to the requests by sending technical information (e.g., device specifications, service set identifier ("SSID") of the network, etc.) to the mobile devices. An example of conventional communication between a mobile device and a WiFi access point in a WiFi network is illustrated in FIG. 1. As shown in FIG. 1, the device can additionally transmit an authorization request to the WiFi access point, which can respond with an authentication success message and subsequently establish a communication session with the device.

More information concerning WiFi radio signal packet types is set forth in Appendix A.

A typical probe request includes various information regarding the mobile device, including the mobile device's media access control ("MAC") address (which is a unique string of letters and numbers that identifies the network interface of the mobile device), signal strength, and other non-personally identifiable information. Because a mobile device with WiFi functionality turned on or enabled will continually broadcast probe requests, these probe requests are increasingly being used as signals to track the presence and movement of users. That is, by simply using existing WiFi infrastructure or a custom WiFi sensor, probe requests (and the information contained therein) can be recorded and later processed for tracking purposes. Retail stores in shopping malls are now tracking their customers' movements by following the WiFi signals from their smartphones to study consumer behavior—Euclid Analytics provides a tracking system that measures signals between a smartphone and a WiFi antenna to count the number of people who walk by and enter a store; and RetailNext is another company involved in this space.

To prevent a mobile device from broadcasting probe requests, or any other radio signal that can enable remote capturing and tracking, a user can turn off or disable the corresponding radio communication functionality of their mobile device. Although this is a simple and easy way to prevent tracking, it does introduce productivity and usability issues. In terms of productivity, for example, the mobile device user may lose desired online connectivity and may be unable to access remote resources, such as web pages or e-mail if radio communication functionality of the mobile device is turned off. In terms of usability, the user must remember to turn the functionality off when not needed, and on again when needed, which in today's busy life, can be difficult.

Furthermore, the architecture of current mobile operating systems includes probe requests in their WiFi implementation, which cannot be easily blocked simply by running separate code or software. This leaves mobile device users with no option of preventing tracking other than by manually turning off the radio communication functionality entirely.

SUMMARY OF THE INVENTION

Generally speaking, it is an object of the present invention to safeguard user privacy by preventing remote radio-based tracking of mobile devices without user consent.

According to at least one embodiment, one or more radio communication functionalities of a mobile device can be automatically disabled, which can prevent radio signals from being broadcasted and subsequently captured and stored for tracking purposes. According to at least another embodiment, a radio communication functionality can be automatically disabled and enabled depending on predefined criteria. By automatically enabling the functionality (which would, for example, enable probe request broadcasts in WiFi systems) under some circumstances, and automatically disabling the functionality (which would, for example, disable the probe request broadcasts) under other circumstances, a balance between always-on connectivity and productivity without compromising privacy can be achieved. Because mobile device tracking is typically based on movement of the device, the radio communication functionality of the mobile device can be automatically turned on and off depending on the device's movements and location, and more particularly, on whether or not the device is located in or is transitioning into or out of an area where one or more probe request receiving devices, such as WiFi access points, are present.

Various techniques and/or systems can be employed to determine if a mobile device is moving. According to at least one embodiment, the SSID broadcast of the WiFi protocol can be leveraged to determine movement of a mobile device. Most WiFi access points automatically transmit their network name or SSID at regular intervals, which allows discovery by clients, such as mobile devices. Each mobile device equipped with a WiFi receiver is configured to maintain a list of SSIDs broadcasted by near-by WiFi access points. By determining changes in the broadcasted SSIDs (e.g., the number of SSIDs, etc.), movement of the mobile device can be detected. Additionally, or alternatively, the WiFi receiver can monitor the signal strength of each available WiFi access point, and changes in any of the signal strengths can be used to detect movement of the mobile device.

According to at least another embodiment, Global Positioning Systems ("GPS"), mobile cell attribute techniques such as GSM base station triangulation, and/or accelerometer sensors, which are available on most modern mobile devices, can be employed to determine movement of the mobile device. More particularly, the location of the mobile device can be obtained (e.g., using one of more of these systems) and stored while the device is located in range of a WiFi access point of a trusted network (e.g., a network in the home or work location of the user) and/or while the device is communicatively coupled or connected to the WiFi access point. The location of the mobile device can thereafter be monitored, and the WiFi receiver can be automatically enabled or disabled depending on whether the mobile device is in or out of range of the WiFi access point. For example, the wireless receiver can be disabled when the mobile device moves out of range of the WiFi access point, and enabled when the mobile device moves in range. In this way, a combination of the device location and information regarding trusted wireless networks can be leveraged to enable/disable the WiFi receiver to prevent tracking. It should be appreciated that GPS and/or accelerometer sensors may not be leveraged to distinguish between movements in and about a private location vs. a public location, without first defining these locations.

Still other aspects and advantages of the present invention will in part be obvious and will in part be apparent from the specification.

The present invention accordingly comprises the several steps and the relation of one or more of such steps with respect to each of the others, and embodies features of construction, combinations of elements, and arrangement of parts adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 5 is a table of example parameters utilized in the process shown in FIG. 4.

DETAILED DESCRIPTION OF THE PREFERRED EMBODIMENTS

Figure 1:
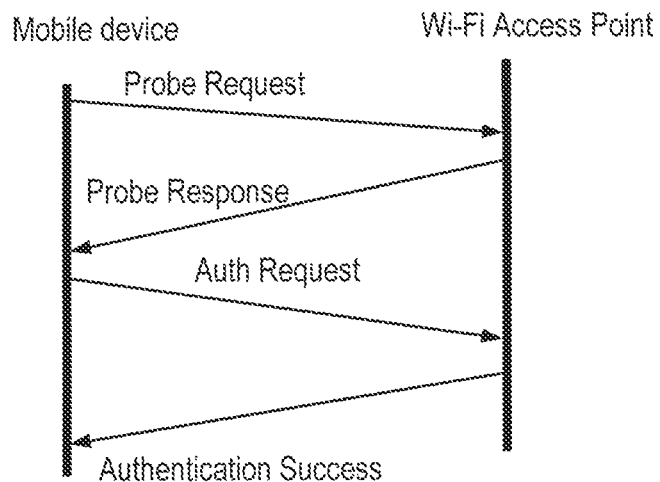
FIG. 1 depicts a communication sequence between a device and a WiFi access point in a WiFi network according to the prior art.
Figure 2:
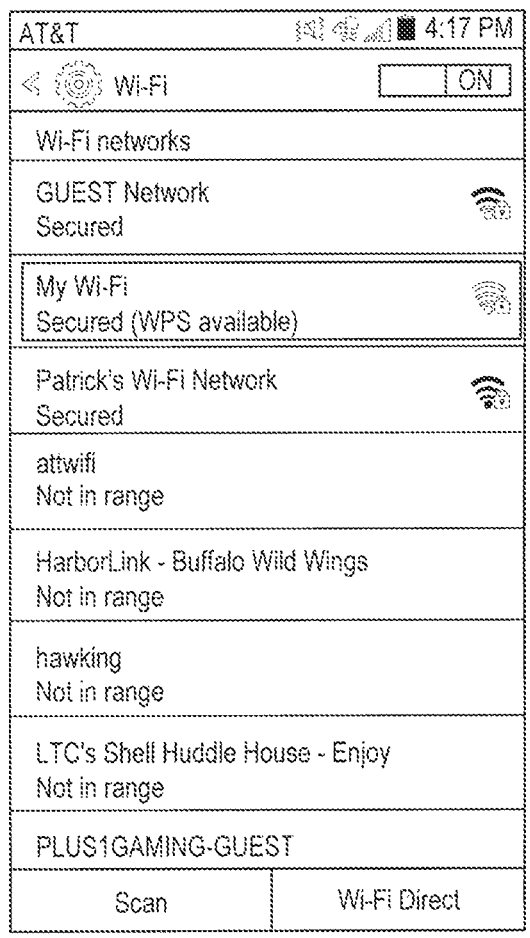
FIG. 2 depicts an example of an SSID list displayed on a mobile device according to an embodiment of the present invention.

An example of an SSID list displayed on a mobile device is illustrated in FIG. 2. As shown in FIG. 2, the SSID list can include the names of one or more networks that are in range and out of range from the mobile device. The networks shown in the list and/or the availability status of the listed networks may change depending on the location of the mobile device with respect to the WiFi access points of these networks. By monitoring changes in the list of received SSIDs over a period of time, movement of the mobile device can be detected. According to at least one embodiment, the time when one or more changes to the list occurs can be identified and stored. Moreover, one or more of the attributes provided in typical SSID broadcast signals (e.g., signal strength, MAC address, SSID name, etc.) can also be recorded.

Device movement or changes in its location can then be determined according to a predefined time threshold. For example, the device can be determined to have moved if, within a preselected time period, e.g., 15 seconds, one or more new SSIDs are added to the SSID list, the signal strength of at least one prior SSID is reduced, and/or one or more SSIDs are removed from the list.

Once movement is detected, the WiFi radio module of the mobile device can be put on snooze or otherwise disabled for a predefined time. After the snooze time period ends, the device movement detection can be effected again to determine if the WiFi radio module should remain disabled or if it should be re-enabled. This detection can be effected again in any suitable manner, including by temporarily turning on the WiFi radio module in order to receive SSID broadcasts to update the SSID list. For example, subsequent to enabling the WiFi radio module after the snooze time period elapses, the SSID list and/or signal strength data stored prior to or at the time of the snooze can be compared with currently detected SSIDs and/or signal strength to determine whether the WiFi radio module should be disabled again or remain enabled.

It should be understood that the user can also be given the option of enabling or disabling the inventive tracking prevention system on their mobile device as they desire. Detecting mobile device movement by detecting changes in the SSID list can be more efficient than using GPS or accelerometer sensors, since there is no need to predefine the device's initial or actual geographic location. According to at least one embodiment, however, tracking prevention can, in addition, or as an alternative, to the SSID list, utilize other systems, such as GPS and accelerometer sensors, to further enhance accuracy of the detection.

As discussed above, it is counterproductive for users to have to manually disable the radio modules of their mobile devices to avoid being tracked when the devices are in public areas. It can thus be advantageous if the radio module of a mobile device is automatically disabled when it is determined that the mobile device is not in the vicinity of any known or trusted WiFi access points, such as those at a user's home, office, or other trusted location. For example, it can be beneficial to automatically disable the WiFi radio module when the user is commuting between home and office.

Thus, in at least one embodiment, a list of trusted WiFi access points and their associated locations can be stored on the mobile device, where the WiFi radio module is enabled or disabled depending on the proximity of the mobile device to one of these access points. A software application, such as a smartphone app, can provide this functionality automatically, and can include a user control interface as well as process logic (e.g., a background service) for overall control of the radio module.

Figure 3:
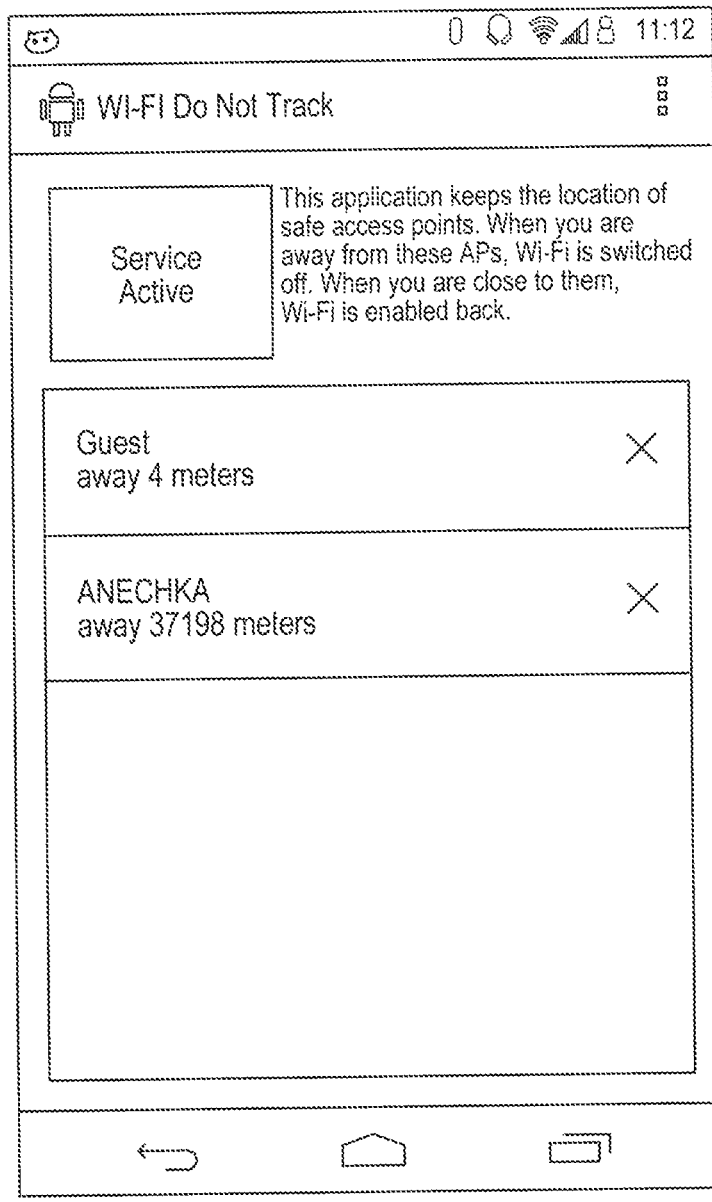
FIG. 3 depicts an example of a user control interface displayed on a mobile device according to an embodiment of the present invention.

An example of the user control interface displayed on a mobile device is illustrated in FIG. 3. As shown in FIG. 3, the control interface includes a list of trusted access points (that shows the current distance between the mobile device and each access point in the list, and that allows access point entries to be removed) and a user selectable option for activating and deactivating the background service. The location of the access point can be determined by identifying the location of the mobile device while the device is connected to the access point. For example, one or more of GPS and cell tower location techniques can be employed to identify the location of the mobile device while the device is connected to the access point, and this location can be stored as the approximate location of the access point. As another example, known databases storing WiFi router information (e.g., one or more Google® databases) can also be accessed to determine the location of an access point.

Figure 4:
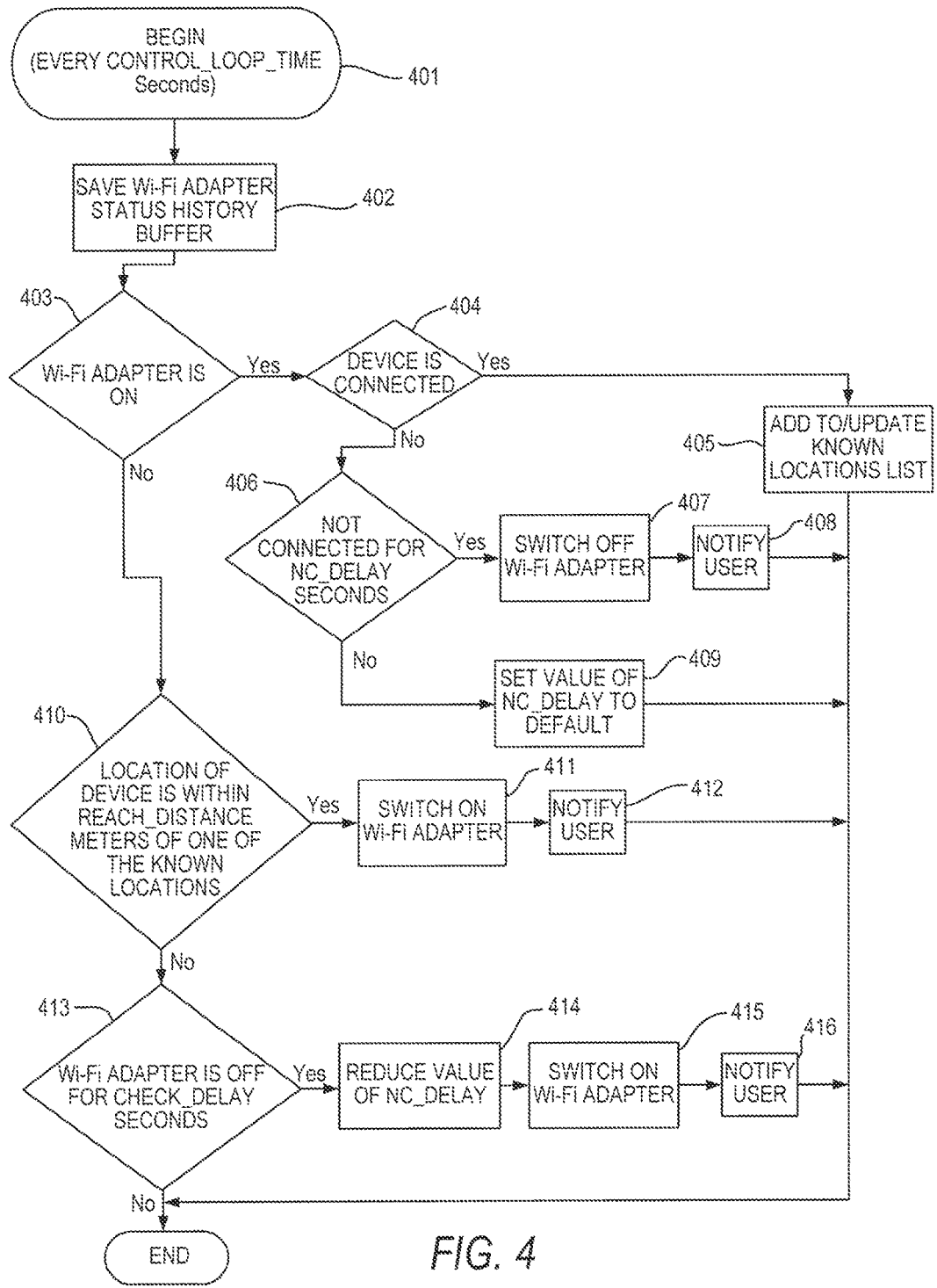
FIG. 4 is a flowchart showing an exemplary mobile device tracking prevention process according to an embodiment of the present invention.

An example of process logic implemented by the mobile device application is illustrated in FIG. 4. A table of example parameters utilized in the process is presented in FIG. 5. As shown in FIG. 4, the background service periodically executes the logic every "CONTROL_LOOP_TIME" seconds (e.g., every 30 seconds) (step 401). Upon each execution, the background service stores any buffer status or history information on the radio module (step 402), and determines whether the radio module is currently enabled (step 403).

If the radio module is currently enabled, the background service then determines whether the radio module is currently connected to an access point or network (step 404). If the radio module is currently connected to an access point, the background services adds information regarding the access point (e.g., SSID) to the list of trusted access points (step 405), or, if it already exists in the list, updates the information in the list as needed. The process then ends, and is periodically repeated every "CONTROL_LOOP_TIME" seconds. If, however, the radio module is not currently connected to an access point, then the background service determines whether the radio module has not been connected to any access point for more than a predefined time of "NC_DELAY" seconds (which can be a dynamic time variable that is different depending on the circumstances—e.g., the default and maximum value can be five times the value of CONTROL_LOOP_TIME, and the minimum value can be three times the value of CONTROL_LOOP_TIME) (step 406). It should be appreciated that the time that the WiFi radio was last turned on (and not connected to a network), or last disconnected from some access point, may be logged and used when making the determination in step 406. If the radio module has not been connected to any access point for longer than NC_DELAY seconds, then the background service causes the radio module to be disabled (step 407), and notifies the user of this (e.g., via a pop-up message displayed on the mobile device) (step 408). If, on the other hand, the device has been connected to an access point in the past NC_DELAY seconds, then the background service sets NC_DELAY to its default value (step 409) and ends the process.

Returning to step 403, if the radio module is not enabled, then the background service determines whether the mobile device is located within a predefined distance of "REACH_DISTANCE" meters (e.g., 300 meters) from any of the trusted access points (step 410). To determine the mobile device's location, the background service can leverage one or more of GPS information (e.g., provided by a GPS unit resident on the mobile device) and geographical location information that is typically determined by the mobile device via non-GPS based techniques, such as, for example, GSM base station triangulation.

If the mobile device is within REACH_DISTANCE meters from any trusted access point, then the background service enables the radio module (step 411), and notifies the user of this (step 412). If, however, the device is not within REACH_DISTANCE meters from any trusted access point, then the background service determines whether the radio module has been disabled for more than a predefined time of CHECK_DELAY seconds (e.g., thirty times the value of CONTROL_LOOP_TIME) (step 413). The determination of how long the radio module has been disabled can serve as a reality check, since geographical locations determined using non-GPS based techniques, for example, may not be entirely accurate. If the radio module has been disabled for longer than CHECK_DELAY seconds, then the background service reduces the value of NC_DELAY (e.g., from five times the value of CONTROL_LOOP_TIME to three times the value of CONTROL_LOOP_TIME) (step 414), enables the radio module (step 415), and notifies the user of this (step 416). The shortened NC_DELAY effectively shortens the time threshold for switching off the radio module during the next execution of the logic flow, allowing for the radio module to be disabled again more quickly if the mobile device is indeed not located near any trusted access point.

By automatically detecting mobile device movements, turning the WiFi radio module off for a period of time, and subsequently reassessing the device location after the period of time elapses, user privacy can be automatically safeguarded, without the disadvantage of prolonged loss of WiFi connectivity. Moreover, keeping the WiFi radio module disabled for extended periods helps conserve energy.

According to another embodiment, one or more of GPS, mobile cell attribute techniques such as GSM base station triangulation, and accelerometer sensors, which are available on most modern mobile devices, can be employed to determine movement of the mobile device. More particularly, the location of the mobile device is obtained (e.g., using one of more of these systems) and stored while the device is located in range of a WiFi access point of a trusted network (e.g., a network in the home or work location of the user) and/or communicatively coupled or connected to the WiFi access point. The location of the mobile device is monitored, and the WiFi receiver is automatically enabled or disabled depending on whether the mobile device is in or out of range of the WiFi access point. For example, the wireless receiver is disabled when the mobile device moves out of range of the WiFi access point, and re-enabled when the mobile device moves in range of the WiFi access point. In this way, a combination of the device location and information regarding trusted wireless networks can be leveraged to enable/disable the WiFi receiver. It should be appreciated that the determination of whether the mobile device is in or out of range can be made in any suitable manner. For example, the location (e.g., GPS coordinates) of the mobile device during connection to the access point can be stored and associated with the access point. When the mobile device then moves to a new location outside of the signal coverage area of the access point and the signal becomes lost, that new location can be stored and later used (e.g., in combination the stored location of the access point) to identify when the mobile device has re-entered the signal coverage area.

Although the tracking prevention system and method have been described above in the context of WiFi technology, it should be understood that tracking prevention can also be implemented to work with other radio communication technologies that employ requests and broadcasts similar to probe requests and SSID broadcasts. Moreover, although the background service process has been described above as being implemented based on certain units of time and distance, such as seconds and meters, it should be understood that other units of measurement can also be used (e.g., minutes, feet, etc.).

It should be understood that the foregoing subject matter may be embodied as devices, systems, methods and/or computer program products. Accordingly, some or all of the subject matter may be embodied in hardware and/or in software (including firmware, resident software, microcode, state machines, gate arrays, etc.). Moreover, the subject matter may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate or transport the program for use by or in connection with the instruction execution system, apparatus, or device.

The computer-usable or computer-readable medium may be for example, an electronic, magnetic, optical, electromagnetic, infrared, or semiconductor system, apparatus, device or propagation medium. Computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes RAM, ROM, EEPROM, flash memory or other memory technology that can be used to store information and that can be accessed by an instruction execution system.

Communication media typically embodies computer-readable instructions, data structures, program modules or other data in a modulated data signal such as a carrier wave or other transport mechanism and includes any information delivery media (wired or wireless). A modulated data signal can be defined as a signal that has one or more of its characteristics set or changed in such a manner as to encode information in the signal.

When the subject matter is embodied in the general context of computer-executable instructions, the embodiment may comprise program modules, executed by one or more systems, computers, or other devices. Generally, program modules include routines, programs, objects, components, data structures and the like, which perform particular tasks or implement particular abstract data types. Typically, the functionality of the program modules may be combined or distributed as desired in various embodiments.

It will thus be seen that the objects set forth above, among those made apparent from the preceding description and the accompanying drawings, are efficiently attained and, since certain changes can be made in carrying out the above method and in the constructions set forth for the system without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A mobile device tracking prevention method, comprising:
    using a mobile device to receive data being broadcasted via at least one network access point, the mobile device having a wireless module configured to access the at least one network access point, the broadcasted data including at least one service set identifier ("SSID") that corresponds to a network access point of the at least one network access point;
    monitoring, using the wireless module, for at least one change to the broadcasted data occurring within a predefined time, the at least one change to the broadcasted data including a change in the total number of SSIDs included in the broadcasted data; and
    automatically controlling an operating state of the wireless module such that the module is enabled in the absence of the change in the total number of SSIDs included in the broadcasted data, and is disabled on detection of the change in the total number of SSIDs included in the broadcasted data.

2. The method of claim 1, wherein the at least one change to the broadcasted data further includes a change in a strength of at least one access point signal carrying at least a portion of the broadcasted data.

3. The method of claim 2, wherein, when the wireless module is disabled, the module is disabled for only a predefined period of time.

4. The method of claim 3, further comprising re-enabling the wireless module to be re-enabled after the predefined period of time.

5. The method of claim 1, wherein the mobile device comprises one of a smartphone, a tablet computer, a laptop computer, a notebook computer, and a personal digital assistant.

6. The method of claim 1, wherein the wireless module is one of a Bluetooth, a WiFi, a GSM, and an NFC module.

7. The method of claim 1, wherein each of the at least one network access point is a WiFi access point.

8. The method of claim 1, further comprising causing the mobile device to present a user notification whenever the operating state of the wireless module is adjusted.

9. A mobile device tracking prevention method, comprising:
    monitoring the geographic location of a mobile device with respect to a signal coverage area of a trusted network access point, the mobile device having a wireless module configured to access the trusted access point, the trusted access point being associated with an SSID, the monitoring being effected based at least in part on the SSIDs included in broadcasted data received at the wireless module;
    detecting changes to the geographic location of the mobile device to determine whether the mobile device has one of exited and entered the signal coverage area, the changes including at least one change in the total number of SSIDs included in the broadcasted data; and
    automatically controlling an operating state of the wireless module based on the detected changes such that the wireless module is enabled when the mobile device enters the signal coverage area, and disabled when the mobile device exits the signal coverage area so as to be incapable of communicating with any public access points while the mobile device is outside of the signal coverage area.

10. The method of claim 9, wherein monitoring the geographic location of the mobile device is further effected using at least one of a geographic positioning system ("GPS"), at least one accelerometer sensor, and at least one mobile cell attribute technique.

11. The method of claim 9, further comprising:
determining whether the wireless module has been disabled for at least a predefined first time; and
causing the wireless module to be re-enabled when the wireless module has been disabled for at least the predefined first time.

12. The method of claim 11, further comprising, after causing the wireless module to be re-enabled, identifying whether the wireless module accesses the trusted access point within a predefined second time.

13. The method of claim 12, further comprising causing the wireless module to be disabled if the wireless module fails to access the trusted access point within the predefined second time.

14. The method of claim 9, further comprising, during access to the trusted access point by the wireless module, storing the geographic location of the mobile device as an in-range location.

15. The method of claim 14, wherein detecting changes to the geographic location is based on the in-range location.

16. The method of claim 9, wherein the mobile device comprises one of a smartphone, a tablet computer, a laptop computer, a notebook computer, and a personal digital assistant.

17. The method of claim 9, wherein the wireless module is one of a Bluetooth, a WiFi, a GSM, and an NFC module.

18. The method of claim 9, wherein the trusted network access point is a trusted WiFi access point.

19. The method of claim 9, further comprising causing the mobile device to present a user notification whenever the operating state of the wireless module is adjusted.

20. A computer program product comprising a non-transitory medium storing computer executable program logic to cause at least one data processing device of a mobile device to:
receive data being broadcasted via at least one network access point, the mobile device having a wireless module configured to access the at least one network access point, the broadcasted data including at least one SSID that corresponds to a network access point of the at least one network access point;
monitor for at least one change to the broadcasted data occurring within a predefined time, the at least one change to the broadcasted data including a change in the total number of SSIDs included in the broadcasted data; and
automatically control an operating state of the wireless module such that the module is enabled in the absence of the change in the total number of SSIDs included in the broadcasted data, and is disabled on detection of the change in the total number of SSIDs included in the broadcasted data.

21. A computer program product comprising a non-transitory medium storing computer executable program logic to cause at least one data processing device of a mobile device to:
monitor the geographic location of the mobile device with respect to a signal coverage area of a trusted network access point, the mobile device having a wireless module configured to access the trusted access point, the trusted access point being associated with an SSID, the monitoring being effected based at least in part on the SSIDs included in broadcasted data received at the wireless module;
detect changes to the geographic location of the mobile device to determine whether the mobile device has one of exited and entered the signal coverage area, the changes including at least one change in the total number of SSIDs included in the broadcasted data; and
automatically control an operating state of the wireless module based on the detected changes such that the wireless module is enabled when the mobile device enters the signal coverage area, and disabled when the mobile device exits the signal coverage area so as to be incapable of communicating with any public access points while the mobile device is outside of the signal coverage area.

22. A mobile device tracking prevention system, comprising:
at least one data processing device of a mobile device, configured to:
receive data being broadcasted via at least one network access point, the mobile device having a wireless module configured to access the at least one network access point, the broadcasted data including at least one SSID that corresponds to a network access point of the at least one network access point;
monitor for at least one change to the broadcasted data occurring within a predefined time, the at least one change including a change in the total number of SSIDs included in the broadcasted data; and
automatically control an operating state of the wireless module such that the module is enabled in the absence of the change in the total number of SSIDs included in the broadcasted data, and is disabled on detection of the change in the total number of SSIDs included in the broadcasted data.

23. A mobile device tracking prevention system, comprising:
at least one data processing device of a mobile device, configured to:
monitor the geographic location of the mobile device with respect to a signal coverage area of a trusted network access point, the mobile device having a wireless module configured to access the trusted network access point, the trusted access point being associated with an SSID, the monitoring being effected based at least in part on the SSIDs included in broadcasted data received at the wireless module;
detect changes to the geographic location of the mobile device to determine whether the mobile device has one of exited and entered the signal coverage area, the changes including at least one change in the total number of SSIDs included in the broadcasted data; and
automatically control an operating state of the wireless module based on the detected changes such that the wireless module is enabled when the mobile device enters the signal coverage area, and disabled when the mobile device exits the signal coverage area so as to be incapable of communicating with any public access points while the mobile device is outside of the signal coverage area.

* * * * *